(12) United States Patent
Wörz

(10) Patent No.: US 8,899,126 B2
(45) Date of Patent: Dec. 2, 2014

(54) ROBOT WITH CALIBRATION POSITION

(75) Inventor: Norbert Wörz, Erkheim (DE)

(73) Assignee: Multivac Sepp Haggenmuller GmbH & Co. KG, Wolfertschwenden (DE)

( * ) Notice: Subject to any disclaimer, the term of this patent is extended or adjusted under 35 U.S.C. 154(b) by 436 days.

(21) Appl. No.: 12/962,993

(22) Filed: Dec. 8, 2010

(65) Prior Publication Data

US 2011/0132131 A1 Jun. 9, 2011

(30) Foreign Application Priority Data

Dec. 9, 2009 (DE) .......................... 10 2009 057 585

(51) Int. Cl.
*B25J 17/00* (2006.01)
*B25J 9/16* (2006.01)

(52) U.S. Cl.
CPC .............. *B25J 9/1623* (2013.01); *B25J 9/1692* (2013.01); *Y10S 901/03* (2013.01)
USPC .......................... 74/490.05; 74/490.01; 901/3

(58) Field of Classification Search
USPC ............. 74/490.01, 490.03, 490.05; 414/729, 414/732, 735, 742, 743; 901/3, 15, 19, 23, 901/27, 50
See application file for complete search history.

(56) References Cited

U.S. PATENT DOCUMENTS

| | | | | |
|---|---|---|---|---|
| 3,830,011 A | * | 8/1974 | Ochrymowich | 446/126 |
| 4,790,718 A | | 12/1988 | Vickers | |
| 5,931,098 A | * | 8/1999 | Bates | 101/484 |
| 6,516,681 B1 | * | 2/2003 | Pierrot et al. | 74/490.01 |
| 6,896,473 B2 | | 5/2005 | Schuler | |
| 8,109,171 B2 | * | 2/2012 | Nakao et al. | 74/490.03 |
| 8,225,692 B2 | * | 7/2012 | Kock et al. | 74/490.03 |
| 2003/0121351 A1 | * | 7/2003 | Gosselin et al. | 74/490.05 |
| 2009/0269180 A1 | | 10/2009 | Wäppling et al. | |
| 2010/0005919 A1 | * | 1/2010 | Breu | 74/490.05 |
| 2010/0101359 A1 | | 4/2010 | Breu et al. | |
| 2010/1010359 | | 4/2010 | Breu et al. | |

FOREIGN PATENT DOCUMENTS

| | | |
|---|---|---|
| DE | 19818635 A1 | 11/1999 |
| DE | 19921325 A1 | 3/2000 |
| DE | 102006011823 A1 * | 9/2007 |
| DE | 102007004379 A1 * | 7/2008 |

(Continued)

OTHER PUBLICATIONS

Extended European Search Report Dated Mar. 31, 2011, Application No. 100152636-2316—Applicant Multivac Sepp Haggenmueller GmbH & Co. KG, 9 Pages.

(Continued)

*Primary Examiner* — Troy Chambers
*Assistant Examiner* — Emily Cheng
(74) *Attorney, Agent, or Firm* — Husch Blackwell LLP

(57) ABSTRACT

A robot according to the present disclosure includes a support structure and at least three main arms mounted to be movable relative to the support structure, wherein the outer ends facing away from the support structure are movable to different spatial positions relative to the support structure and relative to each other. The robot further comprises connecting elements having the same lengths by means of which the outer end of each main arm can be connected at a defined distance from the outer end of the two adjacent main arms. The present disclosure also provides a method of calibrating a robot.

15 Claims, 4 Drawing Sheets

(56) References Cited

FOREIGN PATENT DOCUMENTS

| | | |
|---|---|---|
| DE | 102007004166 A1 | 8/2008 |
| EP | 0200369 A1 | 11/1986 |
| EP | 1293691 A1 | 3/2003 |
| EP | 2098339 A1 | 9/2009 |
| JP | 2009255197 A | 11/2009 |
| WO | 2008092710 A1 | 8/2008 |

OTHER PUBLICATIONS

Ludovic Savoure et al., "An Improved Method for the Geometrical Calibration of Parallelogram-based Parallel Robots", Proceedings of the 2006 IEEE International Conference on Robotics and Automation (Orlando, Florida), May 2006, pp. 769-776.

P. Maurine et al., "A Calibration Procedure for the Parallel Robot Delta 4", Proceedings of the 1996 IEEE International Conference on Robotics and Automation (Minneapolis, Minnesota), Apr. 1996, pp. 975-980.

German Search Report Dated Mar. 31, 2011, Application No. 10015263.6-2316—Applicant Multivac Sepp Gaggenmueller GmbH & Co. KG, 9 Pages.

* cited by examiner

ROBOT WITH CALIBRATION POSITION

CROSS-REFERENCE TO RELATED APPLICATIONS

This application claims foreign priority benefits under 35 U.S.C. §119(a)-(d) to German patent application number DE 102009057585.5, filed Dec. 9, 2009, which is incorporated by reference in its entirety.

TECHNICAL FIELD

The present invention relates to a robot, as well as to a method for calibrating a robot.

BACKGROUND

With robots, preferably delta robots with three or more axes, servomotors and downstream mechanics, for example the main arms and their bearings, are usually arranged symmetrically in order not to render kinematic transformation unnecessarily complicated. Such delta robots are known, for example, from EP 0 200 369 A1 or EP 1 293 691 B1.

After assembly and the connection of the servomotors to a master controlling means have been completed, the positions of the drives to the associated measuring systems, preferably absolute rotary transducers located on the axles of the servomotor, must be calibrated. The coordinates or dimensions and positions of the servomotors, main arms, forearm bars and joints can be entered into the controlling means and stored. To bring the drives into a position known to the kinematic transformation, the main arms are brought into the position in which the joints at the outer end of the main arms lie in the same horizontal plane as the axles of the servomotors. Since these positions are located in a free three-dimensional space for the fitter, setting aids, which are mounted to the support structure at which the servomotors are attached, are used to function as stop for the main arms.

These setting aids themselves must, just as the support structure for the servomotors, be manufactured very precisely, so that the assembly area for the setting aid to the position of a servomotor and thus to the servomotor axle is subjected to only small tolerances, if possible, as inaccuracies and tolerances in these areas can add and lead to variations with respect to the theoretically assumed parameters or measures stored in the controlling means.

These variations lead to variations in the position of the positioning plate where products are picked up and placed, and also to inaccuracies in the positioning of products. Moreover, mechanical loads can occur at the joints if the movements do not take place as theoretically calculated in the kinematic transformation.

As an alternative, setting aids can also have mounting (reference) surfaces at a support frame to which the support structure for the servomotors is attached, the surfaces being provided for the setting aid or aids. Here, the influence of processing accuracies and tolerances is not less critical.

All these known procedures have in common that calibration via such setting aids is not very precise, and above all, there is a disadvantage in that the setting aids are usually not delivered together with the robot but have to be taken along from the works by the service engineer, if, for example, a servomotor has to be replaced and subsequently calibrated on site.

SUMMARY

It is an object of the present disclosure to provide a robot which does not comprise the disadvantages of the prior art.

In a robot according to the present disclosure with a support structure and at least three main arms mounted to be movable relative to the support structure, where the outer ends of the main arms facing away from the support structure can be moved to different spatial positions relative to the support structure and relative to each other, the outer ends of each main arm are connectable with connecting elements having the same lengths at a defined distance to the outer end of the two adjacent main arms. Here, the outer ends of the main arms form an equilateral triangle whose dimensions and coordinates are known to the controlling means. Thus, the servomotors can be calibrated without the aid of further mechanical calibration devices.

The support structure can be attached to a support frame or be part of the support frame itself which is embodied as housing or gantry. At the support structure, one drive is provided for each main arm mounted therein, preferably embodied as servomotor. All servomotors are connected to a controlling means which is adapted to transform the kinematic transformation of the robot. Usually, forearms are attached to the main arms of the robot which in turn are together fixed to a positioning plate which is adapted to pick up one or several products and position them along a desired trajectory.

To be able to control such a movement of the positioning plate via the main arms, a kinematic transformation is required in the controlling means, and for this, all servomotors are very precisely calibrated at the occasion of the commissioning. This means that the servomotors are moved to a position known to the controlling means, and the position of the measuring system of each servomotor is taken over by the controlling means in the position in which calibration is being effected, and correlated with the kinematic transformation. Subsequently, the robot can assume its tasks, for example transferring products, without any mechanical loads or collisions in the mechanical structure of the robot occurring.

Here, it is advantageous to deactivate the brake devices attached to the servomotor, so that the fitter can manually move the main arms for commissioning. As an alternative, the servomotors can also be, preferably very slowly, traversed to a desired position by an inching mode via an operator button and the controlling means.

As a prerequisite, here at least some forearms, in most cases consisting of two forearm bars, should be separable from the main arms or the positioning plate to such an extent that a free movement of the main arms is possible. The invention can also be designed such that the main arms comprise joints at their sides facing away from the support structure to which connecting elements having same lengths can be attached such that one connecting element connects two adjacent main arms and one connecting element is located between each main arm. Thus, an equilateral triangle is formed in the plane of the connecting elements for example with a three-axis delta robot, where all three main arms have a same angle with respect to the bearings in the support structure.

The calibration of the kinematic transformation can be accomplished via the dimensions of the bearing points of the main arms, the main arms themselves and the position of the joints and the length of the connecting elements.

The joints are preferably designed as socket joints which make the for example two forearm bars per forearm at the main arm suited for application in the operation of the robot, and connecting elements can be also fixed to them to connect two adjacent main arms each such that all main arms can be brought into a position defined for calibration which is possibly also predetermined.

Here, it in particular makes sense to use the forearm bars themselves as connecting elements which previously were separated partially from the main arms and partially from the positioning plate. This offers the advantage that no additional connecting elements are required for calibration, and thus the forearm bars can be used even in case of later service works, for example for replacing a servomotor, without having to look for or provide additional connecting elements.

In a method according to the present disclosure, the outer ends of the main arms are moved towards each other until all main arms are connected by connecting two adjacent main arms each by means of the connecting elements. This leads to a clear common calibration position of all main arms and thus also of the corresponding servomotors or their measuring systems. Here, the connecting bars form an equilateral triangle in their common plane in a three-axis delta robot.

To be able to move the main arms manually, brake means preferably provided at the servomotor are deactivated.

The connecting elements are attached to existing joints of the main arms which are preferably designed as socket joints. The advantage of these socket joints with a matching counterpart at the connecting element is that this connection is free from backlash, if, for example, the counterpart of the socket joint (designated as "ball socket") at the connecting element is pushed to the socket joint by elastic aids, such as springs or tension rubbers. It is also conceivable to design the ball socket as joint at the main arm and the socket joint at the connecting element.

According to a variant of the method according to the present disclosure, the forearm bars, which form the forearm which is in turn fixed to the main arms, are used as connecting elements. Here, these are separated partially from the main arms and partially from the positioning plate to be subsequently able to connect two adjacent main arms each by means of the forearm bars via the joints and in the process move the main arms to the calibration position.

This calibration position is a forced position which is fixed on the one hand by the position and dimensions of all interconnected components, where this position is, on the other hand, not variable as an attempted deflection of one or several components leads to counter tensions in this mechanical system having the tendency to return the components to the calibration position.

Below, an advantageous embodiment of the present disclosure will be illustrated more in detail with reference to the below drawings.

DETAILED DESCRIPTION

Figure 1:
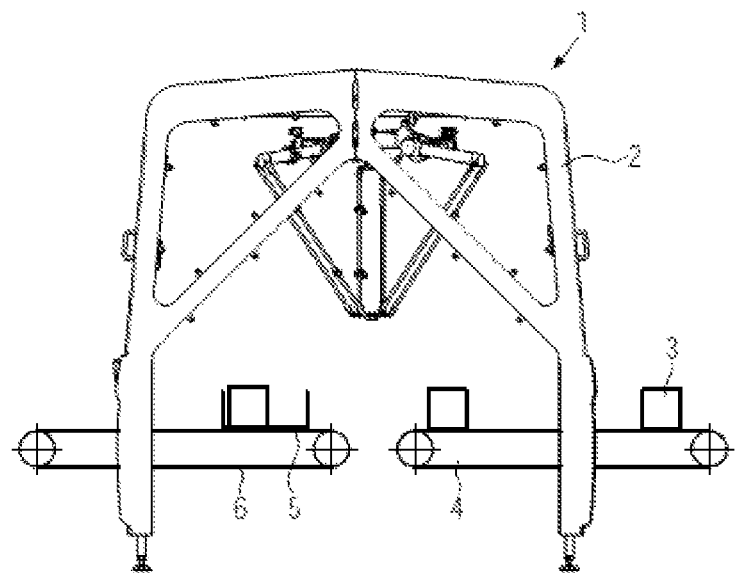
FIG. 1 shows a side view of an embodiment of the robot according to the present disclosure with a support frame.

Equal components are always provided with equal reference numerals in the figures.

FIG. 1 shows a side view of a three-axis delta robot 1 at a support frame 2. The robot 1 can perform, for example, the function of placing products 3 from a feed belt 4 into a container 5 located on a discharge belt 6.

Figure 2:
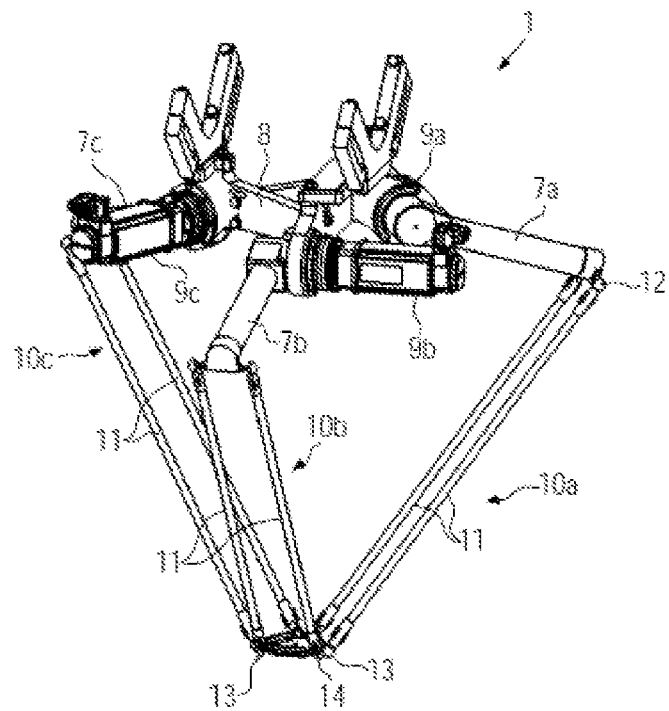
FIG. 2 shows the robot shown in FIG. 1 without support frame for operation.

In FIG. 2, the robot 1 is shown without support frame 2. The main arms 7a, 7b, 7c are mounted at the support structure 8 and driven by servomotors 9a, 9b, 9c. For operation, forearms 10a, 10b, 10c are provided which each have two forearm bars 11 to establish a connection by means of joints 12 at the end of the main arms 7a, 7b, 7c and joints 13 at the positioning plate 14, so that the positioning plate 14 can be positioned by way of the movement of the three main arms 7a, 7b, 7c.

Figure 3:
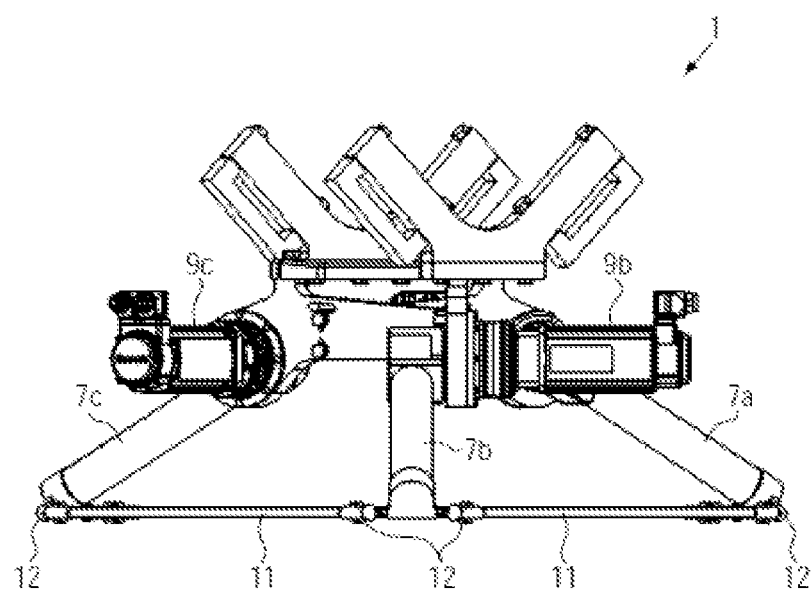
FIG. 3 shows the robot shown in FIG. 2 in a calibration position.

FIG. 3 shows the robot 1 in its calibration position. Here, the adjacent joints 12 of the main arms 7a, 7b, 7c are interconnected via the three forearm bars 11. Before this condition is reached, the brake means, which are preferably located in the servomotor 9a, 9b, 9c or on the servomotor axle, are deactivated. This can be done via a controlling means which is not represented. Thus, the operator or fitter is in a position to manually move the main arms 7a, 7b, 7c individually or together. For this, the forearm bars 11 are partially separated from the joints 12 at the main arms 7a, 7b, 7c and the joints 13 at the positioning plate 14, as on the one hand only three forearm bars 11 can be employed in the calibration position, and on the other hand a connection to the positioning plate 14 is not provided. The main arms 7a, 7b, 7c are moved approximately to the calibration position shown in FIG. 3, and a first forearm bar 11 is attached between two adjacent main arms 7a, 7b. For this, it might be necessary to attach the forearm bar 11 at the main arm 7a, 7b, for example by means of a not represented elastic device in a self-supporting manner. Subsequently, the next forearm bar 11 is attached to the main arms 7b, 7c in the same manner. When the third and last forearm bar 11 is attached between the not yet interconnected main arms 7c, 7a, this is only possible in a position defined by the position and dimensions of the main arms 7a, 7b, 7c, the joints 12 and the forearm bars 11. This position is preferably the calibration position.

Figure 4:
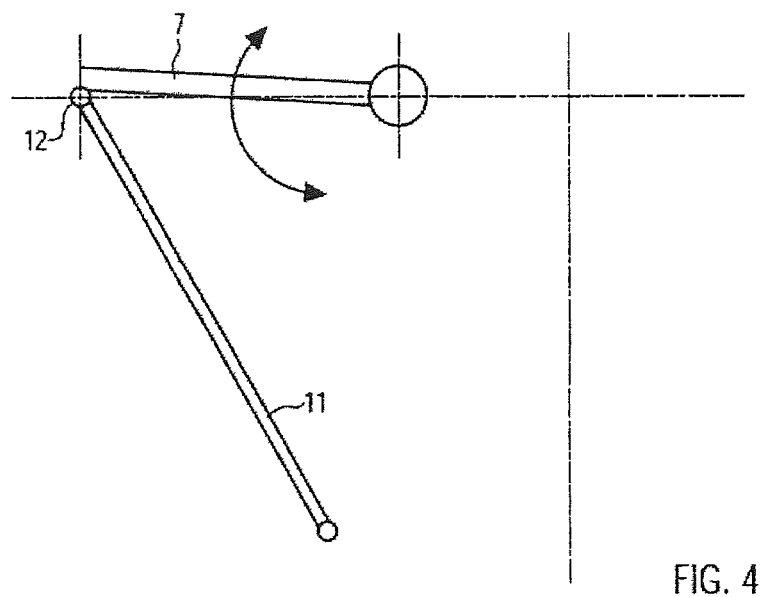
FIG. 4 shows a schematic side view in an operating position with a main arm and a forearm.

In FIG. 4, a schematic side view of a main arm 7 with the joint 12 attached to the end and the forearm bar 11 connected therewith is shown. The connection of the forearm bar 11 with the positioning plate 14 is not represented here.

Figure 5:
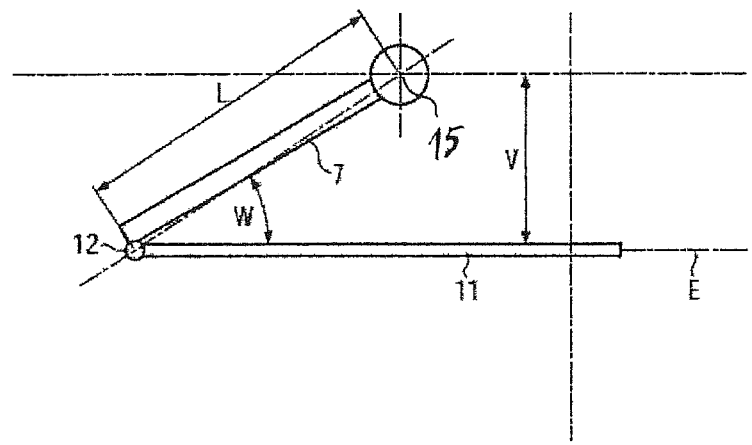
FIG. 5 shows a schematic side view in a calibration position with a main arm and a forearm.

FIG. 5 shows a schematic side view of the calibration position with a main arm 7, a joint 12 and a forearm bar 11. In this position, the joints 12 and the three forearm bars 11 are located in a common plane E, and the latter is in parallel with the reference plane in which the axes of revolution 15 of the main arms 7a, 7b, 7c are located.

Here, an angle between axes W is set for all three main arms 7a, 7b, 7c, and the distance of the plane E and the plane in which the motor axles are located is designated as vertical distance V. The length L of the main arms is defined as distance of the center of the joint 12 and the axis of revolution 15 of the bearing of the main arm in the support structure 8.

Figure 6:
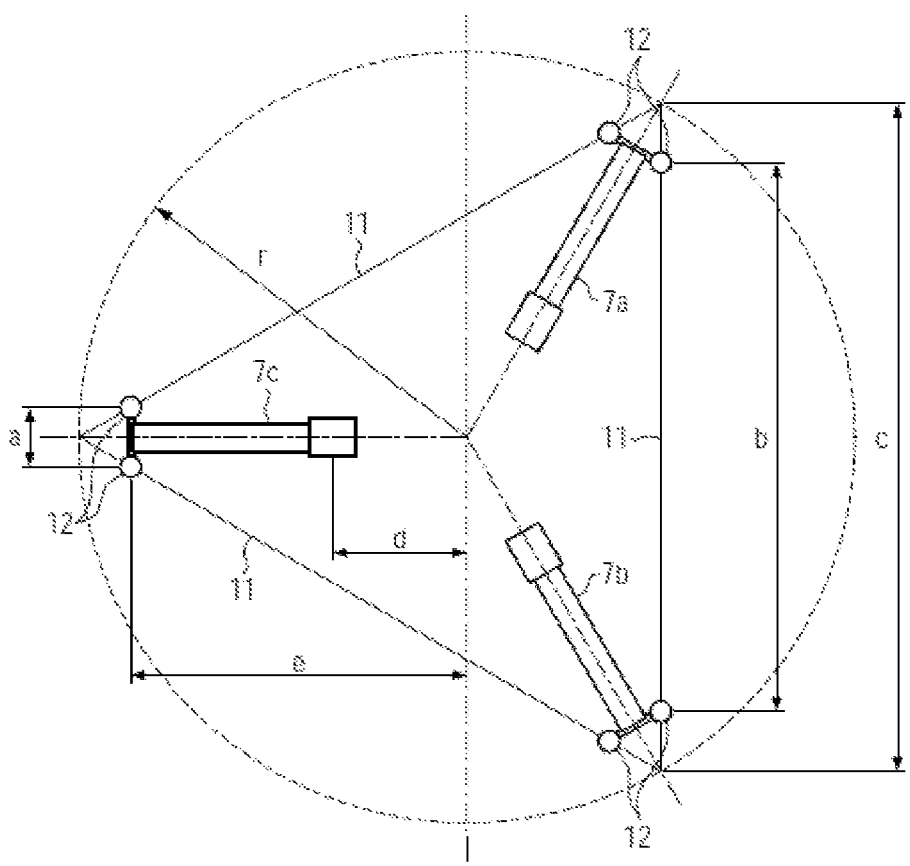
FIG. 6 shows a schematic plan view with main arms and connecting elements in a calibration position.

In FIG. 6, a schematic plan view of the robot 1 in the calibration position is shown. With a three-axis delta robot, the axes of the forearm bars 11 form an equilateral triangle in their common plane E. In this view, further dimensions are defined:

a=distance of two centers of the joints 12 at the end of the main arms 7a, 7b, 7c
b=length of the forearm bar 11
c=edge length of the equilateral triangle
d=distance of the axle of the servomotor, simultaneously also axis of revolution 15 of the bearing of the main arm, to the vertical central axis of the robot e=horizontal distance of the centers of the joints 12 to the vertical central axis of the robot
r=radius through the corner points of the equilateral triangle
L=length of the main arm 7a, 7b, 7c
W=angle between axes of the main arm 7a, 7b, 7c in the calibration position
V=vertical distance of the triangle plane to the reference plane
There are the following mathematical interrelationships:
c=2*a+b
r=root((⅓*c power 2)
e=r−root(a power 2*¾)
W=ARCCOS((e−d)/L)
V=SIN(W)*L The controlling means of the robot includes a kinematic transformation. In the latter, the data for a, b, d, L can be stored. The mathematical interrelationships result in the angle between axes W which can be matched with the measuring systems of the servomotors 9a, 9b, 9c in the calibration position.

For the operation, the connections between the main arms 7a, 7b, 7c are released again by means of the forearm bars 11, and all forearm bars 11 are correspondingly connected with the main arms 7a, 7b, 7c and the positioning plate 14 after calibration.

The invention is not restricted to a three-axis delta robot; robots with more than three main arms 7a, 7b, 7c and/or additional axes which can perform a rotation of the product 3 are rather conceivable.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A robot comprising:
a support structure;
at least three main arms mounted to be movable relative to the support structure, the main arms having outer ends facing away from the support structure and being movable in different relative positions relative to the support structure and relative to each other; and
a plurality of connecting elements, each connecting element having the same length;
an operating position;
a calibrating position;
wherein all of the plurality of connecting elements connect directly to and span between the outer ends of the at least three main arms and a positioning plate of said robot in the operating position, and at least one of said plurality of connecting elements being disconnected from the positioning plate and connected directly to and spanning between the outer ends of two adjacent main arms in the calibrating position.

2. The robot according to claim 1 wherein the main arms are movable manually.

3. The robot according to claim 1 wherein the outer ends of the main arms comprise joints that are interconnectable by means of the connecting elements.

4. The robot according to claim 1 wherein the outer ends of the main arms have joints, and the robot includes forearms for connecting the outer ends of the main arms at the joints, and wherein each forearm comprises two forearm bars, the forearm bars comprise the connecting elements, and at least one forearm bar is releasable from the joint of one of the main arms.

5. The robot according to claim 1 wherein the robot is designed as a three-axis delta robot.

6. The robot of claim 1 wherein in the calibrating position, at least three connecting elements lie substantially in the same plane and each of the at least three connecting elements span between and are connected directly to the outer ends of two adjacent main arms.

7. The robot of claim 6 wherein the at least three main arms include a first main aim, a second main arm, and a third main arm, and wherein the at least three connecting elements include a first connecting element, a second connecting element, and a third connecting element, and wherein in the calibrating position, the first connecting element is connected directly to the first main arm and the second main arm, the second connecting element is connected directly to the second main arm and the third main arm, and the third connecting element is connected directly to the third main arm and the first main arm.

8. A robot comprising:
a support structure;
at least three main arms mounted to the support structure such that the main arms are movable relative to the support structure, the main arms having outer ends spaced away from the support structure and being movable in different positions relative to the support structure and relative to each other;
an operating position;
a calibrating position; and
a plurality of connecting elements, each connecting element having an equal length and being moveable between the operating position and the calibrating position and wherein all of said plurality of connecting elements connect the outer ends of the at least three main arms to a positioning plate in said operating position, and wherein at least one of the connecting elements disconnect from said positioning plate and directly connect and span between two outer ends of two adjacent main arms in the calibrating position.

9. The robot of claim 8 wherein in the calibrating position, the connecting elements connected directly to and spanning between the outer ends of the main arms are located in a common plane.

10. The robot of claim 9 wherein in the calibrating position the connecting elements are configured to connect the outer end of each main arm with the outer ends of two adjacent main arms.

11. The robot of claim 10 wherein in the calibrating position, the connecting elements connected directly to and spanning between with the outer ends of the main arms define an equilateral triangle.

12. The robot of claim 8 wherein in the operating position, movement of the main arms controls a position of the positioning member.

13. The robot of claim 12 wherein each connecting element has a first end connected to a one of the main arms, and a second end releasably connectable with both the positioning member and another one of the main arms.

14. The robot of claim 8 wherein the at least three main arms include a first main arm, a second main arm and a third main arm, and wherein the plurality of connecting elements includes a first connecting element, a second connecting element, and a third connecting element, and wherein in the calibrating position, the first connecting element is connected directly to the first main arm and the second main arm, the second connecting element is connected directly to the second main arm and the third main arm, and the third connecting element is connected directly to the third main arm and the first main arm.

15. A robot comprising:
- a support structure;
- at least three main arms mounted to the support structure such that the main arms are movable relative to the support structure, the main arms having outer ends spaced away from the support structure and being movable in different positions relative to the support structure and relative to each other;
- a plurality of connecting elements, each connecting element having an equal length; and
- an operating position comprising each of the plurality of connecting elements connected to and spanning between one of said at least three main arms and a positioning plate;
- a calibrating position comprising at least three of the connecting being disconnected from the positioning plate, and repositioned to span between and be connected directly to the outer ends of two adjacent main arms to interconnect the at least three main arms such that the at least three connecting elements lie substantially in the same plane.

* * * * *